(12) United States Patent
Lemoine

(10) Patent No.: US 7,917,515 B1
(45) Date of Patent: Mar. 29, 2011

(54) SYSTEM AND METHOD OF ACCELERATING PROCESSING OF STREAMING DATA

(75) Inventor: Eric T. Lemoine, La Jolla, CA (US)

(73) Assignee: LSI Corporation, Milipitas, CA (US)

( * ) Notice: Subject to any disclaimer, the term of this patent is extended or adjusted under 35 U.S.C. 154(b) by 424 days.

(21) Appl. No.: 11/691,327

(22) Filed: Mar. 26, 2007

(51) Int. Cl.
*G06F 7/00* (2006.01)
*G06F 17/30* (2006.01)

(52) U.S. Cl. ............... 707/741; 707/956; 707/758

(58) Field of Classification Search ............ 707/2
See application file for complete search history.

(56) References Cited

U.S. PATENT DOCUMENTS

| | | | | |
|---|---|---|---|---|
| 2001/0014210 A1* | 8/2001 | Kang | ............... | 386/96 |
| 2002/0038320 A1* | 3/2002 | Brook | ............... | 707/513 |
| 2004/0028049 A1* | 2/2004 | Wan | ............... | 370/394 |
| 2005/0014494 A1* | 1/2005 | Owen et al. | ............... | 455/419 |
| 2005/0114871 A1* | 5/2005 | Wolff et al. | ............... | 719/331 |
| 2005/0273772 A1* | 12/2005 | Matsakis et al. | ............... | 717/136 |
| 2007/0005786 A1* | 1/2007 | Kumar et al. | ............... | 709/230 |
| 2007/0113172 A1* | 5/2007 | Behrens et al. | ............... | 715/513 |
| 2007/0288840 A1* | 12/2007 | Girle et al. | ............... | 715/513 |
| 2008/0040498 A1* | 2/2008 | Setlur et al. | ............... | 709/231 |

OTHER PUBLICATIONS

Jacobs, Sas. "Foundation XML for Flash," Chapter 2: Introduction to XML, 2006.*
Eugene Y. C. Wong et al., Efficient Management of XML Contents over Wireless Environment by Xstream, Mar. 17, 2004, 2004 ACM Symposium on Applied Computing, 1122-1127.*
L. Fegaras, D. Levine, S. Bose, and V. Chaluvadi, "Query Processing of Streamed XML Data," Proc. 11th Int'l Conf. Information and Knowledge Management, Nov. 2002.*

* cited by examiner

*Primary Examiner* — Mohammad Ali
*Assistant Examiner* — Kannan Shanmugasundaram

(57) ABSTRACT

Embodiments include methods and systems for processing XML documents. One embodiment is a system that includes a method of efficiently processing XML documents received concurrently from a plurality of network connections in the form of streams of data. Other embodiments include systems configured to perform such processing of streamed XML documents. Other embodiments include systems and methods of efficiently performing document processing using digests for identifying XML document structure.

11 Claims, 5 Drawing Sheets

SYSTEM AND METHOD OF ACCELERATING PROCESSING OF STREAMING DATA

RELATED APPLICATIONS

This application is related to U.S. application Ser. No. 11/691,297, filed on even day herewith, which is incorporated by reference in its entirety.

BACKGROUND OF THE INVENTION

1. Field of the Invention

The invention relates to a system and method for processing structured documents such as extended markup language (XML) documents.

2. Description of the Related Technology

Extensible markup language (XML) is a data description language that provides a mechanism to represent structured data in a way that retains the logical structure and interrelationship of the underlying data. In XML, data is represented as Unicode text using standardized markup syntax to express the structural information about that data. In brief, XML syntax includes tags (a string bracketed by '<' and '>') and attributes (syntax of the form attribute_name="value"). The particular tags and attributes used in a document may be selected with reference to the type of data that is represented by a particular document. Moreover, an XML document may be constructed to conform to a document type declaration (DTD). A DTD is a formal description of a particular type of document. It sets forth what elements the particular type of document may contain, the structure of the elements, and the interrelationship of the elements.

While XML is human readable, XML documents, particularly those which conform to a well-known or standardized DTD, provide a convenient means of data exchange between computer programs in general, and on the Internet in particular. However, many of XML's features, as well as the use of text and the structures encoded within the text, make XML document processing processor intensive. Thus, in systems that exchange a high volume of XML data, e.g., e-commerce systems that process XML encoded security data, XML processing may tend to consume so much of a server's processing power that the amount of processing power remaining to actually apply the XML data to the relevant application may be impacted. One solution to this problem is to offload processing of XML queries to dedicated content processors that employ hardware specifically configured to process XML. However, the memory and processor requirements associated with XML processing have limited the cost effective implementation of content processing for XML queries. Thus, simpler, yet resource efficient systems and methods of processing XML documents are needed.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include lower latency and more efficient processing of XML documents.

One embodiment comprises a method of processing XML documents received over a network. The method includes receiving a packet comprising data of one of a plurality of XML documents via at least one network. Each of the XML documents comprises a plurality of elements that define a hierarchy. The method further includes identifying which of the XML documents is associated with the packet. The method further includes identifying at least one element of the XML document in the packet. The method further includes determining a position of the element in the hierarchy of the XML document. The method further includes providing the identified element and the position of the identified element in the hierarchy for processing the XML document.

One embodiment comprises a method of incrementally processing structured documents received over a network. The method includes receiving partial data of one of a plurality of structured documents via at least one network. Each of the documents comprises a plurality of elements that define a hierarchy. The method further includes identifying which of the structured documents is associated with the partial data. The method further includes determining which of the elements of the document are included in the received partial data. The method further includes determining a position of each of the received elements in the hierarchy. The method further includes providing, for processing, the received elements and the position of each of the received elements in the hierarchy.

One embodiment comprises an apparatus for processing structured documents received over a network. The apparatus includes a network interface configured to receive partial data of one of a plurality of structured documents via at least one network. Each of the documents comprises a plurality of elements that define a hierarchy. The apparatus further includes a memory configured to store data associated with each of the documents. The apparatus further includes a processor configured to: identify which of the structured documents is associated with the partial data, determine which of the elements of the document are included in the received partial data, determine a position of each of the received elements in the hierarchy, store the position and at least a portion of the determined elements in the memory, and process the partial data of the identified structured document based at least partly on the received elements and the position of each of the received elements in the hierarchy.

One embodiment comprises a content processor for incrementally processing structured documents received over a network. The content processor includes means for receiving partial data of one of a plurality of structured documents via at least one network. Each of the documents comprises a plurality of elements that define a hierarchy. The content processor further includes means for storing data associated with each of the documents. The content processor further includes means for processing the received partial data. The processing means is configured to: identify which of the structured documents is associated with the partial data, determine which of the elements of the document are included in the received partial data, determine a position of each of the received elements in the hierarchy, store the position and at least a portion of the determined elements in the memory, and process the partial data of the identified structured document based at least partly on the received elements and the position of each of the received elements in the hierarchy.

One embodiment comprises a method of incrementally processing XML documents received over a network. The method includes receiving a packet comprising data of one of a plurality of XML documents via at least one network. Each of the XML documents comprises a plurality of elements that define a hierarchy. The method further includes identifying which of the XML documents is associated with the packet. The method further includes identifying at least one element of the XML document in the packet. The method further includes identifying a specified portion of the document. The specified portion comprises the at least one received element. The method further includes generating a digest value based on the specified portion. The digest value is indicative of the hierarchy of at least the specified portion of the XML document. The method further includes retrieving data from a cache based on the isomorphic digest value. The method further includes processing the XML document based at least partly on the retrieved data.

Another embodiment includes an apparatus for processing XML documents received over a network. The apparatus includes a network interface configured to receive a packet of one of a plurality of XML documents via at least one network. Each of the documents comprises a plurality of elements that define a hierarchy. The apparatus further includes a memory configured to store data associated with each of the documents. The apparatus further includes at least one processor configured to: identify which of the XML documents is associated with the packet, identify at least one element of the XML document in the packet, and identify a specified portion of the document. The specified portion comprises the at least one received element. The processor is further configured to generate a digest value based on the specified portion. The digest value is indicative of the hierarchy of at least the specified portion of the XML document. The processor is further configured to retrieve data from the memory based on the isomorphic digest value; and process the XML document based at least partly on the retrieved data.

Another embodiment includes an apparatus for incrementally processing XML documents. The apparatus includes means for receiving a portion of one of a plurality of XML documents. Each of the documents comprises a plurality of elements that define a hierarchy. The apparatus further includes means for storing data associated with each of the documents. The apparatus further includes means for processing the XML documents. The processing means is configured to identify which of the XML documents is associated with the received portion, identify at least one element of the XML document in the received portion, and identify a specified portion of the document. The specified portion comprise the at least one received element. The processing means is further configured to generate a digest value based on the specified portion. The digest value is indicative of the hierarchy of at least the specified portion of the XML document. The processing means is further configured to retrieve data from the memory based on the isomorphic digest value, and process the XML document based at least partly on the retrieved data.

DETAILED DESCRIPTION OF CERTAIN EMBODIMENTS

Figure 1:
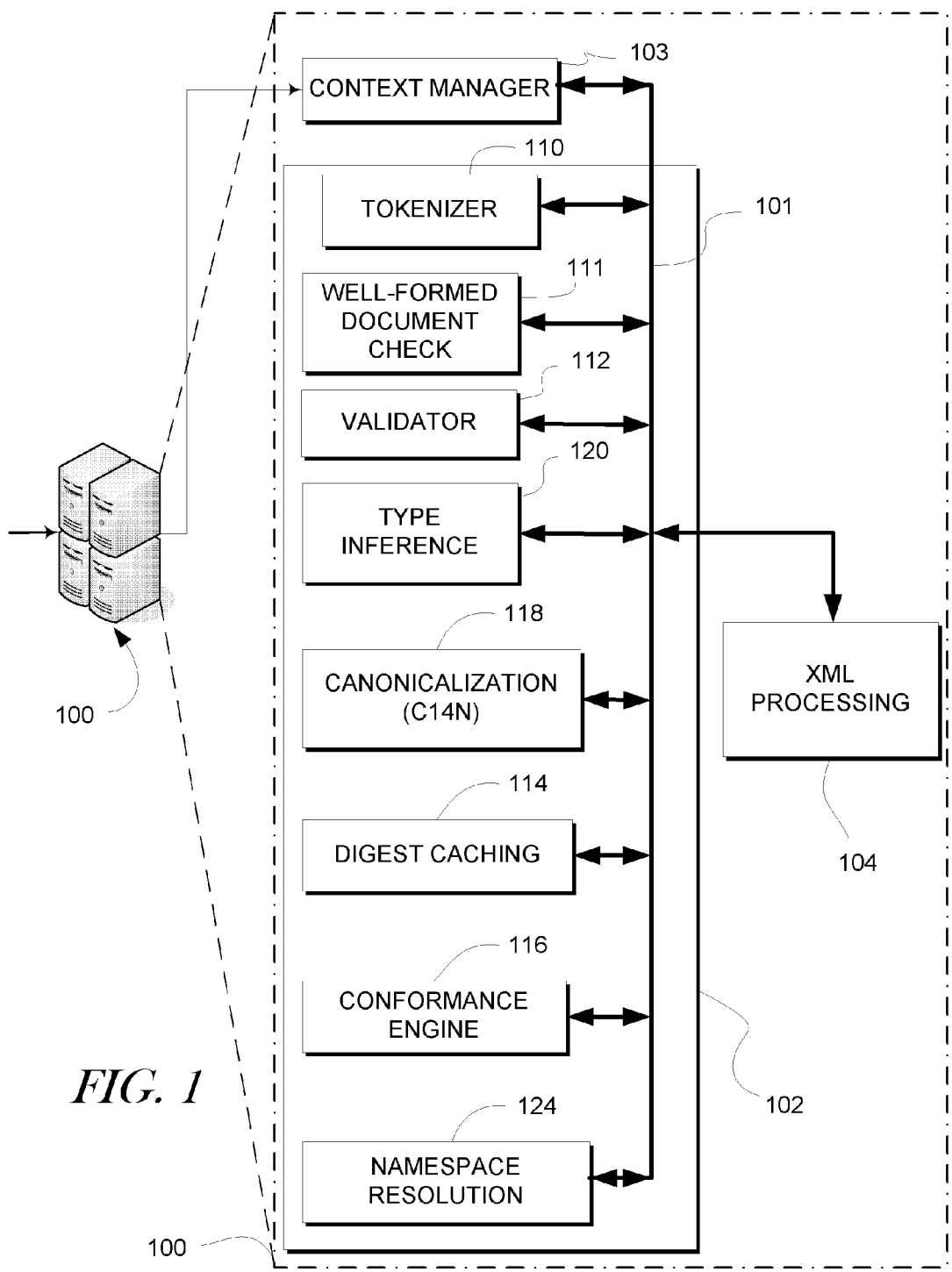
FIG. 1 is a block diagram illustrating an exemplary system for processing XML documents.

The following detailed description is directed to certain specific embodiments of the invention. However, the invention can be embodied in a multitude of different ways as defined and covered by the claims. In this description, reference is made to the drawings wherein like parts are designated with like numerals throughout.

Processing of XML documents is typically performed in a set of sequential steps. The steps used to process a particular document may vary with the content of the XML document. For example, after receiving an XML document, a system may first identify the type of document. For a particular type of document, data in a certain element of the XML document may be desired. Thus, the document may be more fully processed to, for example, resolve namespaces in the document to properly identify the desired data element.

One way of improving processing performance is by using customized hardware to perform part of the XML processing. For example, overall throughput of an XML document processing system, in general, and applicability of hardware acceleration for such processing, in particular, can be improved by speculatively performing certain functions of processing XML documents in parallel upon receipt of such documents for processing. As such documents are further processed, the data derived by the speculatively processed functions is available without delay for continued processing by other XML processing functions.

Moreover, XML documents in many applications are computer generated. Computer generated XML documents tend to have a very consistent structure from document to document, even though the actual data content itself varies. For example, XML documents that describe an "employee," e.g., produced to comply with a DTD or an XML schema that includes an "employee," may be structurally identical, e.g., providing the same elements of each employee with the same structure and with the same order within the structure, with only the actual attribute values of each document varying. More generally, most XML documents received by a system for processing are in fact well formed, valid, designed against an available schema, in canonical XML form, and include namespaces that are known in advance. Thus, the overall processing performance of XML documents can be simplified and thus accelerated by assuming that documents are in such regular forms until data in the document shows otherwise. In particular, such documents can be processed more efficiently by identifying documents that share the structure of a previously processed document so that data structures or other data associated with the prior processing of structural data can be reused.

In addition, it has been found that XML processing utilization of processing hardware can be further increased, with lower document processing latency, by processing multiple streaming documents concurrently (e.g., versus receiving each document in full, then processing the complete documents sequentially). Desirably, in addition to lower latency, less memory may be used to store each of the documents while waiting for their complete arrival. In addition, documents can be characterized by a received portion of their structure to determine whether further processing is specified. For documents for which no further processing is specified, processing can be terminated after only a partial portion has been received to provide more efficient processing of such documents.

FIG. 1 is a block diagram illustrating an exemplary system 100 for processing XML documents. In one embodiment, the system 100 includes one or more processors in communication with memory and storage. The system 100 includes speculative processing modules 102 that process an XML document received by the system 100 and provide data regarding those functions to an XML processing module 104. The XML processing module 104 is configured to perform any general purpose XML processing, processing of particular schemas, or user configurable or programmable XML processing. As illustrated in FIG. 1, the processing modules 12 and the XML processing module 104 are connected by a data bus 101. The bus 101 may comprise suitable data communications structures, including one or more hardware buses, a shared memory interface, a network interface, or combinations thereof. In one embodiment, one or more of the speculative processing modules 102 execute in parallel. In one embodiment, the system 100 includes one or more general purpose processors and one or more content processors configured to execute software instructions for performing at least some of the functions attributed to the system 100. In one embodiment, the content processors may include general purpose microprocessors or other digital logic circuits, e.g., a programmable gate array (PGA) or an application specific integrated circuit (ASIC) configured to perform at least some of the functions attributed to the system 100. In one embodiment, the speculative processing modules 102 are executed in parallel on one or more of the general purpose processors and/or the content processors. The speculative processing modules 102 perform particular functions in the processing of XML documents that may or may not be needed for any given document and provide that data asynchronously, e.g., without the data being requested, to the XML processing module 104 for further processing. However, by performing portions of the processing in parallel and asynchronously, overall processing time, e.g., system latency, of XML documents can be decreased as compared to serial processing where particular functions of processing are performed only as needed. Moreover, by selecting suitable processing to perform speculatively, such processing can be implemented in hardware to further improve performance. Details of one embodiment of using such speculative processing is disclosed in U.S. patent application Ser. No. 11/145,262, entitled "SYSTEM AND METHOD OF ACCELERATING DOCUMENT PROCESSING," filed Jun. 2, 2005.

In one embodiment, the speculative processing modules 102 include one or more of a tokenizer 110 that processes XML documents into syntactic tokens, a well-formed document check module 111 that at least partially determines whether the XML document is well formed according to the XML specification, and a validator 112 that at least partially determines whether the XML document is valid. In one embodiment, the tokenizer 110 may include hardware for performing tokenization such as described in U.S. patent application Ser. No. 10/831,956 entitled "SYSTEM AND METHOD OF TOKENIZING DOCUMENTS," filed Apr. 26, 2004, which is incorporated by reference in its entirety. In addition, U.S. patent application Ser. No. 10/884,663, entitled "SYSTEM AND METHOD OF XML QUERY PROCESSING," filed Jul. 2, 2004, which is hereby incorporated by reference in its entirety, describes one embodiment of the validator 112 that identifies documents that are not well-formed by using statistics obtained by, for example, the tokenizer 110.

In one embodiment, the speculative processing modules 102 include a digest hashing module 114 that maintains a cache of data associated with XML documents having particular structures. The speculative processing modules 102 may also include a conformance engine 116 that determines whether a document conforms to a particular structure, and identifies data in the document that does so conform.

The speculative processing modules 102 may also include a type inference module 120 that infers the types of attributes of processed XML documents. In one embodiment, the speculative processing modules 102 include a canonicalization (C14N) module 118 that determines whether an XML document is in a particular "canonical" form, such as the canonical XML form defined by the World Wide Web Consortium (W3C). The speculative processing modules 102 may also include a namespace resolution module 124 that resolves names within the XML document structure according to the proper namespace. In other embodiments, the processing modules 102 may comprises fewer or additional modules than those illustrated in the example of FIG. 2.

Those of skill will recognize that the various illustrative modules, logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In operation, an XML document is received by the system 100 for processing. In one embodiment, the XML document is streamed over a network to the system 100. For example, the XML document may be streamed using a packet based protocol such as TCP/IP. The system 100 may concurrently receive any number of documents over respective streams. In one embodiment, a context manager 103 is configured to interface with the network and receive streamed packet data. As each packet is received, the context manager 103 identifies the corresponding document comprising the received data. The context manager 103 further identifies context information associated with the identified document. In one embodiment, the context information may include information about the current position of received data within the XML hierarchy of the identified document. In one embodiment, context manager 103 provides each received packet to the tokenizer 110 and updates the context information of the document as starting or ending tags ("<element>" or "</element>") of elements are received. The context manager 103 provides such context information along with the received tokens to the speculative processing modules 102 and the XML processing module 104 for further processing. Further details of the context manager 103 are discussed below with reference to FIGS. 2 and 3. Desirably, the context information can be used by the processing modules 102 and 104 to reduce (or even eliminate) internal state associated with the documents within the processing modules 102 and 104.

The context manager 103 may comprise a string that represents the partial structure of the document as part of the context information. In one embodiment, the string is determined from the open elements of the document by removing all whitespace, comments, attribute values, and element body or node text values, for example. Additional symbols may be placed within the string to disambiguate elements from attributes. For example, for the sample document in Table 1, below, after the "<e6>" start tag has been received, but prior to </e6> end tag being received, the context information may include the string "<doc><e1><e5><e6#xmlns:e6="http://a.tld/e6nls">." This string includes data indicative of the namespace. In the illustrated example, the entire URI of the namespace is in the context information. In other embodiments, a hash or other data indicative of the namespace may be included in the context information to reduce the context information size. In one embodiment, the URI is compressed and/or Base64 encoded. In other embodiments, a hash value for the URI is calculated, with the hash value stored in the context information in place of the URI. The hash value may also be encoded as a string, e.g., in an encoding such as hex or Base64. After the "<e7>" start tag has been received, but prior to </e7> end tag being received, the context information may include the string "<doc><e1><e5><e7>." Note at that point the <e6> element has been fully received and can be removed from the context information. After the "<e3>" start tag has been received, but prior to </e3> end tag being received, the context information may include the string "<doc><e3#attr1>," e.g., the context information may only include the start <e3> tag because elements e1, e2, and e5 have each ended at this point in the document. More examples are illustrated in Table 1.

TABLE 1

| Document Tags | Context Information Upon Receiving Element Start/End Tags |
|---|---|
| <doc> | <doc> |
|   <e1> | <doc><e1> |
|     <e5> | <doc><e1><e5> |
|       <e6 xmlns:e6= "http:// a.tld/e6nls">... | <doc><e1><e5><e6#xmlns:e6= "http://a.tld/e6nls"> |
|       </e6> | <doc><e1><e5> |
|       <e7>... | <doc><e1><e5><e7> |
|       </e7> | <doc><e1><e5> |
|     </e5> | <doc><e1> |
|   </e1> | <doc> |
|   <e2> | <doc><e2> |
|   </e2> | <doc> |
|   <e3 attr1="attr1value"> | <doc><e3#attr1> |
|   </e3> | <doc> |
|   <e4 attr1="attr1value" > | <doc><e4#attr1> |
| | <doc><e4> |
|   </e4> | <doc> |
| </doc> | |

As illustrated with reference to the element e4, in one embodiment the attributes are stored in the context information until the end of the open tag of the element. In the illustrated embodiment, the attributes (e.g., attr1 of element E3) are removed from the context when the enclosing open tag is complete, e.g., when the ">" token for the open tag is received. In addition to the data indicative of the hierarchical context, the context information may also comprise other data including, for example, the current position within the document, and/or the current position within open elements.

In one embodiment, each of the speculative processing modules 102 processes received portions of the identified XML document based on the received tokens and context information. In one embodiment, each of the speculative processing modules 102 processes the XML document concurrently or in parallel using multiple processors and/or digital logic circuits. The results of the speculative processing are provided to the XML processing module 104 for further processing. As the XML processing module 104 proceeds with processing, processed data provided by the speculative processing modules 102 is available to the XML processing module 104 without further processing delay. The XML processing module 104 may perform processing specific to the particular XML document or documents sharing its schema or structure. This processing of the XML processing module 104 may optionally be performed based on the output of the various processing modules 102. In one embodiment, the context manager 103 can receive, process, and provide multiple blocks or packets of a particular document to the processing modules 102 and 104 such that the blocks are processed concurrently.

In one embodiment, the digest caching module 114 is configured to calculate a hash or digest value that identifies the structure or a received partial structure of an XML document. The digest value is then stored in a data cache so as to identify cached data associated with the structure or other properties of the document. In one embodiment, the cache is a hashtable that identifies the cached data with the respective digest value. The cached document properties may include data or data structures derived by processing the XML document. When a second XML document is received having the same structure or partial structure, and thus the same digest value as the first XML document in the cache, the cached data may be used to process the second document without requiring additional processing time to derive the cached data.

Figure 2:
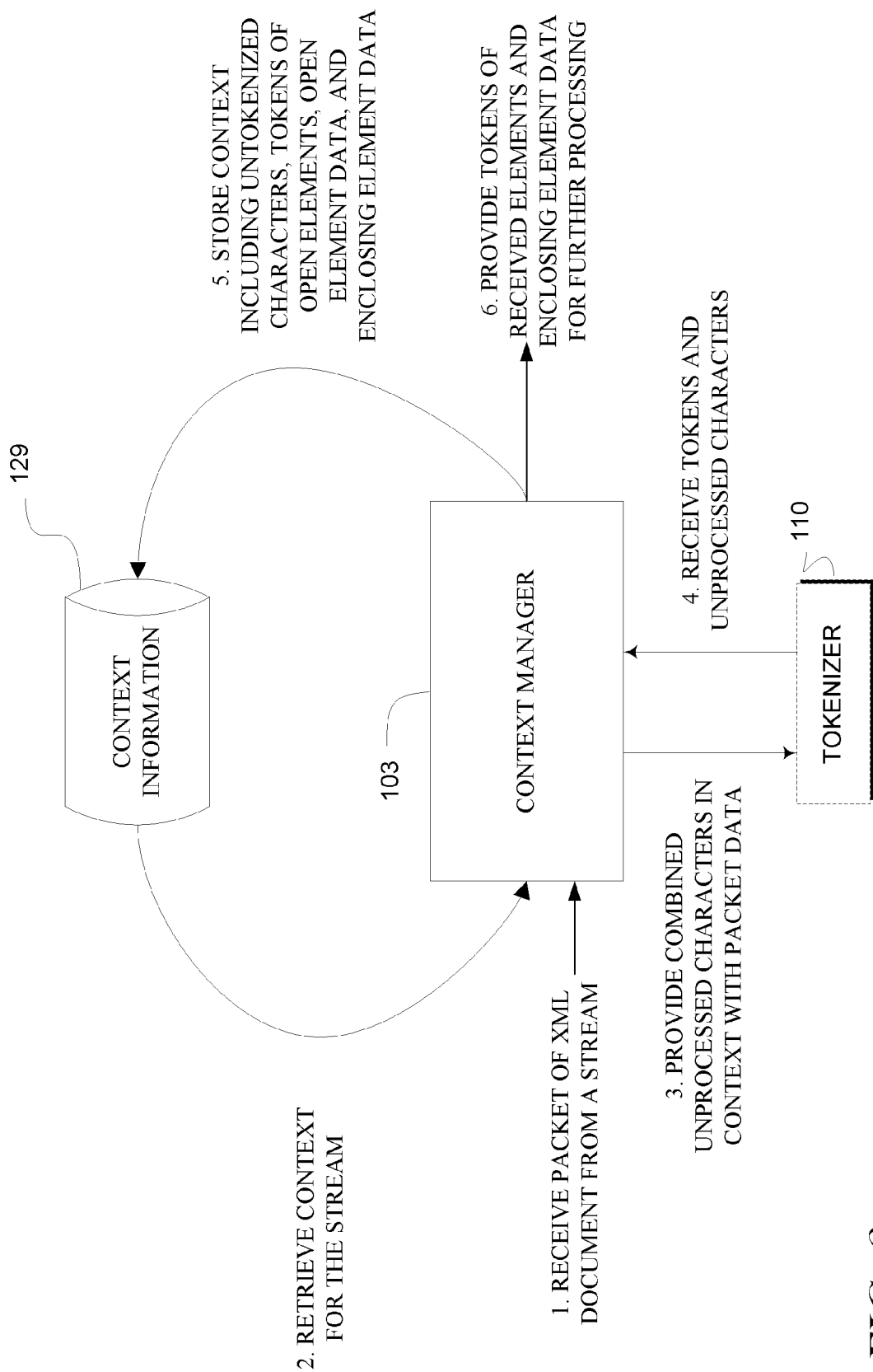
FIG. 2 illustrates the flow of data between system components when processing incoming packets associated with XML documents in a system such as illustrated in FIG. 1.

FIG. 2 illustrates the flow of data between components in an example of the system 100, including the context manager 103, when processing incoming packets associated with XML documents. In particular, in event 1, the context manager 103 receives a packet of a particular XML document in a stream. At event 2, the context manager 103 identifies the associated document and retrieves the context of the stream from a context information database 129. The context information database 129 may use any type of memory or storage, e.g., a volatile memory such as RAM or a non-volatile memory such as a disk or flash memory. The context information of a streamed document may include one or more of unprocessed characters from a prior packet, open XML elements of the streamed document (e.g., a start (e.g., <element>) tag has been received for the element but the corresponding end tag (e.g., </element>) tag has not been received), and other data indicative of the processing state of the stream. In one embodiment, one or more of the modules 102 and 104 may maintain data in the context information database 129 for each streamed documents.

In event 3, the context manager 103 provides untokenized data from the context information and from the received packet to the tokenizer 110. In event 4, the context manager 103 receives tokens from the tokenizer 110 along with an indication of any character data that did not form complete tokens. In event 5, the context manager 103 identifies any completed elements based on the received tokens and stores updated context information, including currently open elements and unprocessed characters to the context information database 129. In event 6, the context manager 103 provides the received tokens along with context information such as data associated with enclosing (open) XML elements to the processing modules 102 and 104.

Desirably, portions of the system 100, such as one or more of the modules 102, or the processing module 104 may be implemented in a stateless fashion, using the context information in place of internal state. A given set of modules 102 and 104 can thus desirably be used to process many streams at once as interspersed packets of data are received and processed for many streams. The system 100 desirably can process data from multiple documents concurrently to maintain full utilization of the modules 102 and 104 while processing streaming XML documents in which individual streams may not be received at a sufficient rate to fully utilize the processing modules 102 and 104. In one embodiment, the system 100 may include multiple stateless processors/units in each of the modules 102 and 104. The system 100 can desirably distribute processing to such stateless modules to improve throughput and/or to provide fail-over functionality.

Figure 3:
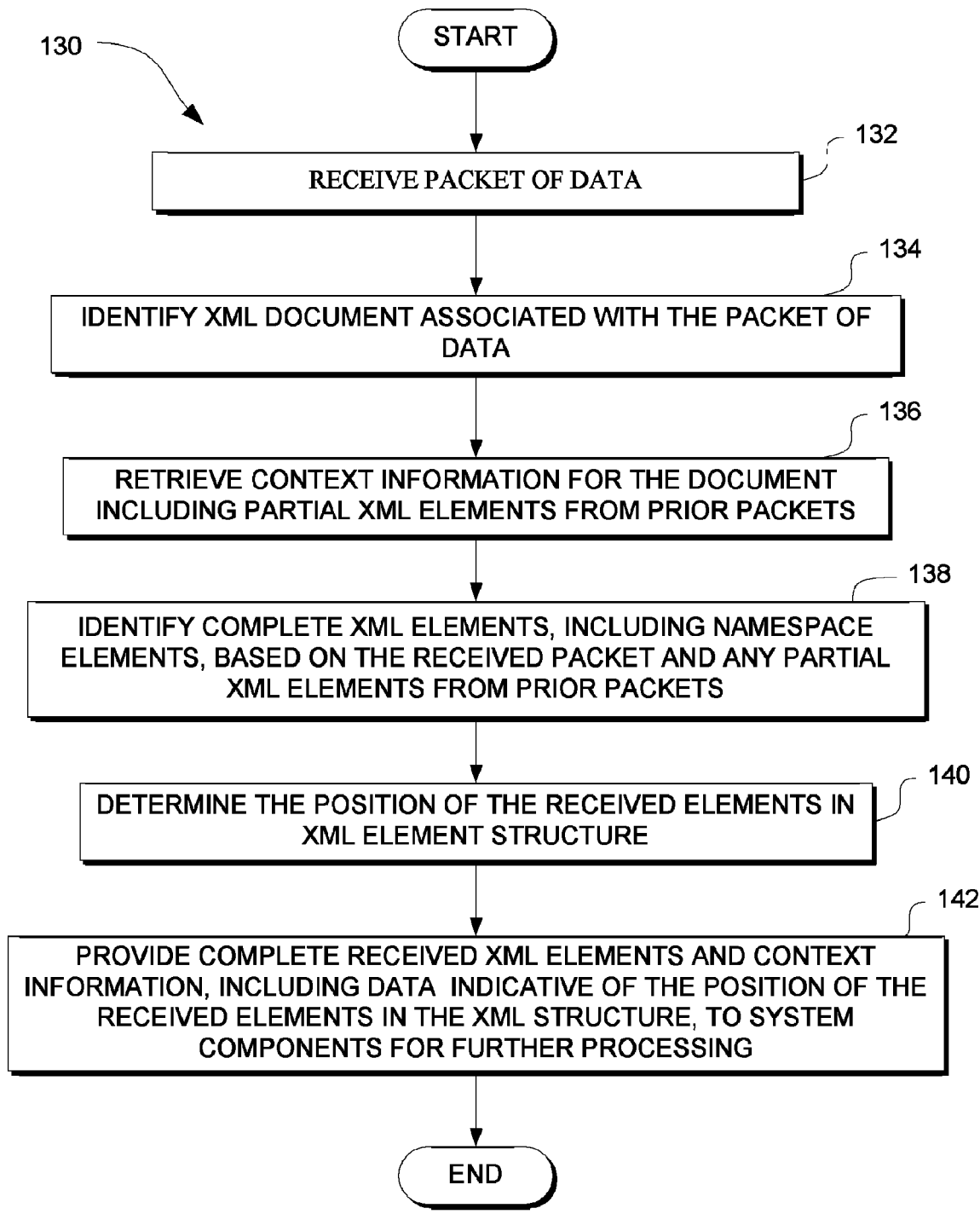
FIG. 3 is a flowchart illustrating an example of a method of processing concurrently received XML streams using a system such as illustrated in FIG. 1.

FIG. 3 is a flowchart illustrating an example of a method 130 of processing concurrently received XML streams using an example of the system 100. The method begins at a block 132 in which the context manager 103 receives a packet of data from a network. Next at a block 134, the context manager 103 identifies an XML document associated with the packet of data. In one embodiment, the context manager 103 identifies the XML document based on an association between the document and a TCP/IP socket associated with the received packet. Moving to a block 136, the context manager 103 retrieves context information for the document, including partially received, enclosing XML elements from prior packets, and other context information such as unprocessed characters from the context information database 129.

Proceeding to a block 138, the context manager 103 tokenizes the received packet using the tokenizer 110 and identifies complete XML elements (elements for which a start tag (<element>) and an end tag (</element>) has been received) based on the tokens in the received packet and any partial XML elements (elements for which no end tag (</element>) has been received) from prior packets that are included in the context information. In one embodiment, the context manager 103 may identify namespace elements based on the received data and store data indicative of the namespace as part of the context information. In one embodiment, the context information associated with each namespace can be reduced in size to a hash, e.g., a SHA-1 hash, calculated for the Uniform Resource Identifier (URI) that identifies the namespace. The hash value may be encoded as a text string, e.g., Base64 encoded. A namespace hash table can be used to store the association between the hash value and the namespace URI. Desirably, the size of the context information can thereby be reduced in comparison to storing complete XML namespace URIs.

Moving to a block 140, the context manager 103 determines the position of the received elements in the XML element structure of the current document. The context manager 103 may then update the context information in the context information database 129 accordingly.

Next at a block 142, the context manager 103 provides the complete received XML elements and the context information, such as data indicative of the position of the received elements in the XML structure and data indicative of namespaces, to other system components such as the modules 102 and 104 for further processing. The method 130 may be repeated as additional packets of XML data are received. For example, the well-formed document check module 111 can determine whether the received portion of the document is well-formed with respect to the XML specification. For example, the check module 111 may whether the XML document is lexicographically correct in terms of syntactic elements. In one embodiment, this check includes comparing the maximum depth of the XML tree to a preselected maximum depth as the document is received. In one embodiment, documents that are not well-formed can thus be detected before the entire document is received. Thus, for example, further processing of such documents can be stopped and the remainder of the document discarded in response to determining that the document is not well-formed. In this embodiment, fewer processing resources may be used on such documents. In addition, denial of service attacks on the system 100 based on sending large documents that are not well-formed can be stopped earlier, e.g., when a mal-formed portion of the document is received.

Figure 4:
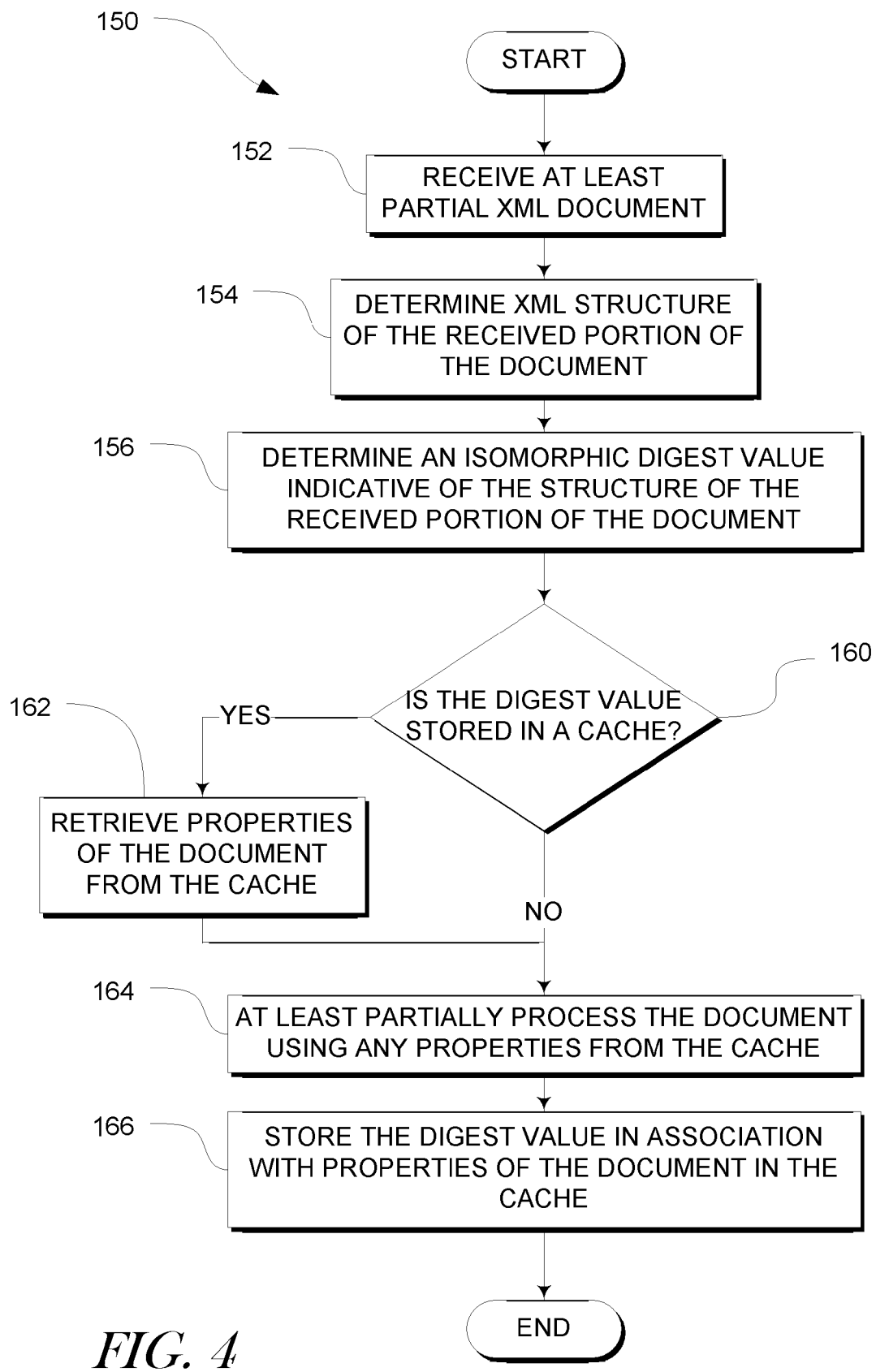
FIG. 4 is a flowchart illustrating an exemplary method of using a system such as illustrated in FIG. 1 to identify and cache documents having substantially similar structures.

FIG. 4 is a flowchart illustrating an exemplary method 150 of using the system 100 to identify and cache documents having substantially similar structures. In one embodiment, data obtained during processing of a first document is cached for later use while processing later received documents that have substantially the same XML structure. The method 150 begins at a block 152 in which the system 100 receives at least a portion of an XML document. As discussed above with reference to FIGS. 2 and 3, XML documents may be received and processed as additional packets are received over a network. Next, at a block 154, the system 100 processes the XML document, e.g., performs initial tokenization and parsing, to determine the structure of the document. In one embodiment, the context manager 103 coordinates initial tokenization and parsing. Moving to a block 156, the digest caching module determines an isomorphic digest value indicative of the structure of the received portion of the XML document. Two XML documents (or partially received documents) may be referred to as being isomorphic if the documents have the same structure. A digest value refers to a representation of the document in the form of a short string or numeric value such as calculated by a one-way or hash function. Generally, the effectiveness of a hash table used to cache data may be limited by the effectiveness of the hash function for uniquely identifying the data being hashed. In one embodiment, a cryptographic hash function, e.g., SHA-1, is used to calculate the digest value for each document. By using such a hash function, there is no reasonable likelihood that two different structures hash to the same value.

An isomorphic digest value is thus a digest value that when calculated for two documents is the same if those two documents have the same structure and different if the two documents have different structure. In one embodiment, the digest value for each document is calculated using a string that represents the structure of the document. In one embodiment, the string is determined from the document by removing all whitespace, comments, attribute values, and node text values. Additional symbols may be placed within the string to disambiguate elements from attributes. Namespace declarations may include the Uniform Resource Identifier (URI) of the namespace. See Table 2 for an example document and structure string. As shown in Table 2, the structure string includes the start tags, end tags, and attribute identifier, but the attribute values are not included in this string. The string can be normalized (for example, using techniques such as used to canonicalize XML documents).

TABLE 2

| | |
|---|---|
| Document | <doc> |
| |   <e1> |
| |     <e5></e5> |
| |   </e1> |
| |   <e2></e2> |
| |   <e3 attr1="attr1value"></e3> |
| |   <e4 attr1="attr1value"></e4> |
| | </doc> |
| Structure | <doc><e1><e5></e5></e1><e2><e3#attr1><e4#attr2></doc> |

Proceeding to a block 160, the digest caching module 114 looks up the digest value of the current document in the cache to determine whether its digest value is stored in the cache. In one embodiment, the cache includes a hashtable that uses digest values as hash keys for identifying cached data. If cached data is identified with the digest value of the current document, the method 150 proceeds to a block 162 in which the cached data, or a pointer to the cached data, is retrieved and provided to other components of the system 100 for use in processing the current XML document. Next at a block 164, the system 100 processes the current XML document, using the cached data. Referring again to the block 160, if no cache data is identified with the digest value, the method 150 proceeds to the block 164, in which the current XML document is processed without benefit of any cached data. Next at a block 166, the digest caching module 114 stores suitable data obtained in processing the document 164 in the cache and identifies that data with the digest value. In one embodiment, the hash table stores a pointer to the data at the entry in the hash table for the digest value in order to identify the data with the digest value.

In one embodiment, the partially structure may be associated with cached data indicating that no further processing is necessary. When such a partial document is received and identified such cached data, additional received data can be discarded, thus freeing up processing resources when the remainder of the document is not of interest. In another embodiment, the socket associated with the XML document may be closed.

In one embodiment, the digest caching module 114 calculates the digest value and looks for cached data associated with the document after every element of the corresponding document is received. In other embodiments, the digest caching module 114 may calculate the digest value and perform the cache lookup when specified conditions are reached, e.g., after one or more specified number of elements is received. The specified numbers may be selected to reduce excess processing by the digest caching module 114 by only calculating the digest value when enough elements to be indicative of the document's structure have been received. In one embodiment, the digest caching module 114 may process documents after the length of the structure string (See Table 2, above) has exceeded specified sizes. For example, the hash may be compared to the cache when the structure string exceeds a number of specified values, e.g., 64 bytes, 128 bytes, 256 bytes, etc. In one embodiment, the digest caching module 114 uses a hash function that can be generated incrementally as new elements are added to the structure string. Moreover, in one embodiment, the incremental hash value along with a running length count can be stored in place of the complete structure string to reduce memory usage.

It is to be recognized that depending on the embodiment, certain acts or events of any of the methods described herein, including those described with reference to FIGS. 3 and 4, can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Figure 5:
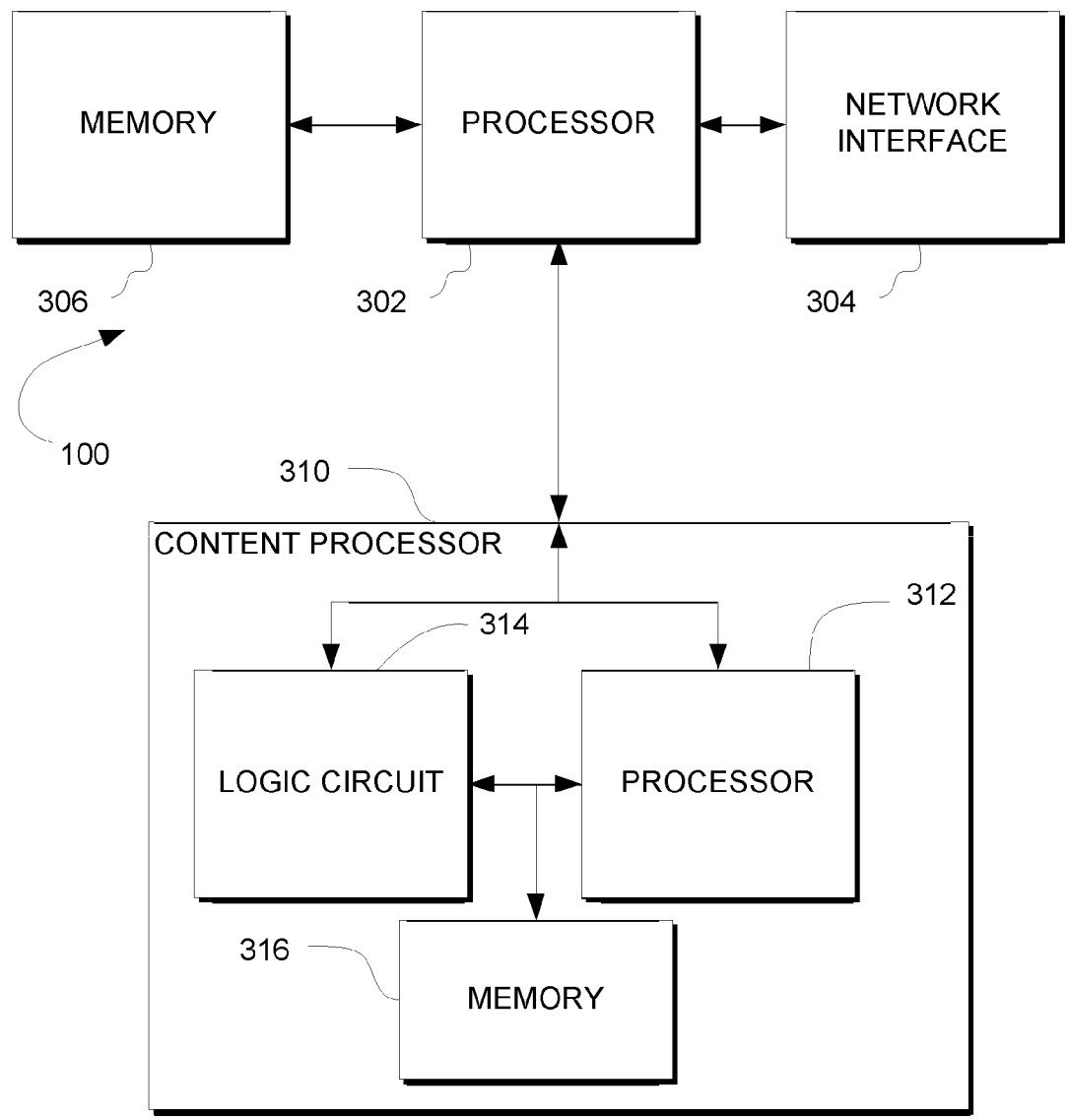
FIG. 5 is a block diagram illustrating in more detail one embodiment of the system of FIG. 1.

FIG. 5 is a block diagram illustrating one embodiment of the system 100. The exemplary system 100 includes a processor 302 operably connected to a network interface 304 and a memory 306. In the exemplary system 100, the processor 302 is also connected to a content processor 310. In one embodiment, the content processor 310 includes a processor 312. In one embodiment, the content processor 310 includes a logic circuit 314. The content processor 310 may also include a memory 316. In one embodiment, the content processor 310 is embodied as an ASIC or a PGA. The functions of the processing modules 102 and the context manager 103 may be performed by the content processor 310 using, for example, either or both of the processor 312 and logic circuit 314. In one embodiment, at least a portion of the processing of the XML module 104 is performed by the content processor 310. In one embodiment, at least a portion of the functions of one or more of the processing modules 102, the context manager 103, and the processing module 104 are performed by the processor 302.

While certain embodiments have been discussed with respect to incrementally processing XML data as it is received via a network, in other embodiments the data may be incrementally processed from any other suitable source, including a disk or other storage. In addition to improved resource utilization from incremental processing of data received from a network, certain embodiments also desirably improve resource usage in a content processing system by, for example, providing increased opportunities for parallel processing. In addition, embodiments of incremental processing as disclosed herein can also allow reduced memory usage when processing large documents (regardless of whether such documents are received via network or from storage).

It is to be recognized that each of the modules described above may include various sub-routines, procedures, definitional statements and macros. Each of the modules may be separately compiled and linked into a single executable program. The description of each of the modules is used for convenience to describe the functionality of one embodiment of a system. Thus, the processes that are performed by each of the modules may be redistributed to one of the other modules, combined together in a single module, or made available in, for example, a shareable dynamic link library. In some embodiments, the modules may be executed concurrently or in parallel as distinct threads or processes. The modules may be produced using any computer language or environment, including general-purpose languages such as C, Java, C++, or FORTRAN. Moreover, the functions described with respect to the modules may be performed, in all or in part, by either the general purpose processor 302 or the content processor 310 of FIG. 7.

Moreover, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the above, one will appreciate that embodiments of the invention overcome many of the longstanding problems in the art by simplifying XML processing so that such processing can be further accelerated using hardware. In particular, numerous XML processing functions can be performed prior to the entire document being received. Overall XML processing system throughput and latency can thus be improved.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of incrementally processing XML documents, the method comprising:
   receiving a packet comprising data of at least one XML document, wherein each XML document comprises a plurality of elements that define a hierarchy, said hierarchy containing context information for each element relative to a position within the XML document;
   identifying which of the XML documents is associated with the packet;
   identifying at least one element of the XML document in the packet;
   identifying a specified portion of the document, said specified portion comprising the at least one received element;
   generating a digest value based on the specified portion, the digest value indicative of the hierarchy of at least the specified portion of the XML document;
   deriving speculative data by performing at least one function of the processing of the XML document;
   storing, in a cache indexed by the digest value, the derived speculative data, wherein the speculative data comprises data representing an XML structure of at least the specified portion of the XML document; and
   processing a subsequently received XML document based at least partly on the stored data, wherein processing the subsequently received XML document further comprises:
      generating a digest value based on a specified portion of the subsequently received XML document;
      comparing the digest value of the specified portion of the subsequently received XML document to digest values stored in the cache;
      retrieving the data corresponding to the XML structure from the cache if the digest value of the specified portion of the subsequently received XML document matches a digest value stored in the cache;
      employing the data retrieved from the cache to process at least part of the subsequently XML document; and
      discarding received elements of the XML file corresponding to the XML structure.

2. The method of claim 1, wherein receiving the packet comprises receiving the packet over a network.

3. The method of claim 1, wherein the at least one XML element comprises an element tag and a body, and wherein the data indicative of the hierarchy of the elements comprises a string that excludes that at least the body of the at least one XML document.

4. The method of claim 2, wherein the specified portion is identified based on the size of the data indicative of the hierarchy of elements.

5. An apparatus for processing XML documents received over a network, the apparatus comprising:
   a network interface configured to receive a packet of at least one XML document via at least one network, wherein each documents comprises a plurality of elements that define a hierarchy, said hierarchy containing context information for each element relative to a position within the XML document;
   a memory configured to have a cache to store data associated with each of the documents;
   at least one processor configured to:
      identify which of the XML documents is associated with the packet;
      identify at least one element of the XML document in the packet;
      identify a specified portion of the document, said specified portion comprising the at least one received element;
      generate a digest value based on the specified portion, wherein the digest value is indicative of the hierarchy of at least the specified portion of the XML document;
      derive speculative data by performing at least one function of the processing of the XML document;
      store, in the cache, indexed by the digest value, the derived speculative data, wherein the derived speculative data comprises data representing an XML structure of at least the specified portion of the XML document;
      compare a digest value of a specified portion of a subsequently received XML document to digest values stored in the cache;
      retrieve the data corresponding to the XML structure from the cache if the digest value of the specified portion of the subsequently received XML document matches a digest value stored in the cache;
      employ the data retrieved from the cache to process at least part of the subsequently XML document; and
      discard received elements of the XML file corresponding to the XML structure.

6. The apparatus of claim 5, wherein the at least one XML element comprises an element tag and a body, and wherein the data indicative of the hierarchy of the elements comprises a string that excludes that at least the body of the at least one XML element.

7. The apparatus of claim 6, wherein the specified portion is identified based on the size of the data indicative of the hierarchy of the elements.

8. An apparatus for incrementally processing XML documents, the apparatus comprising:
   means for receiving a portion of at least one XML document via at least one network, wherein each document comprises a plurality of elements that define a hierarchy, said hierarchy containing context information for each element relative to a position within the XML document;
   means for storing data associated with each of the documents;

means for processing the XML documents, said means configured to:
  identify which of the XML documents is associated with the received portion;
  identify at least one element of the XML document in the received portion;
  identify a specified portion of the document, said specified portion comprising the at least one received element; and
  generate a digest value based on the specified portion, wherein the digest value is indicative of the hierarchy of at least the specified portion of the XML document;
  derive speculative data by performing at least one function of the processing of the XML document;
  store, in the cache, based on the digest value, the derived speculative data, wherein the speculative data comprises data representing an XML structure of at least the specified portion of the XML document;
  compare a digest value of a specified portion of a subsequently received XML document to digest values stored in the cache;
  retrieve the data corresponding to the XML structure from the cache if the digest value of the specified portion of the subsequently received XML document matches a digest value stored in the cache;
  employ the data retrieved from the cache to process at least part of the subsequently XML document; and
  discard received elements of the XML file corresponding to the XML structure.

9. The apparatus of claim 8, wherein the receiving means comprises at least one of a network interface and a storage element.

10. The apparatus of claim 8, wherein the at least one XML element comprises an element tag and a body, and wherein the data indicative of the hierarchy of the elements comprises a string that excludes that at least the body of the at least one XML element.

11. The apparatus of claim 10, wherein the specified portion is identified based on the size of the data indicative of the hierarchy of the elements.

* * * * *